United States Patent
Carron et al.

(10) Patent No.: US 10,215,340 B2
(45) Date of Patent: Feb. 26, 2019

(54) PRESSURIZED FLUID CYLINDER COMPRISING AN ELECTRONIC DATA-DISPLAY DEVICE

(71) Applicant: L'Air Liquide, Société Anonyme pour l'Etude et l'Exploitation des Procédés Georges Claude, Paris (FR)

(72) Inventors: Amélie Carron, Paris (FR); Beatriz Lopez, Paris (FR); Christophe Roland Rezel, Savigny sur Orge (FR); Philippe Rudnianyn, Villiers sur Orge (FR); Catherine Vivier, Saint-Egreve (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 175 days.

(21) Appl. No.: 15/112,763

(22) PCT Filed: Dec. 19, 2014

(86) PCT No.: PCT/FR2014/053460
§ 371 (c)(1),
(2) Date: Jul. 20, 2016

(87) PCT Pub. No.: WO2015/110724
PCT Pub. Date: Jul. 30, 2015

(65) Prior Publication Data
US 2016/0341364 A1    Nov. 24, 2016

(30) Foreign Application Priority Data
Jan. 22, 2014  (FR) ..................................... 14 50525

(51) Int. Cl.
*G05D 7/06*       (2006.01)
*F17C 13/02*      (2006.01)

(52) U.S. Cl.
CPC ......... *F17C 13/025* (2013.01); *G05D 7/0676* (2013.01); *F17C 2201/0104* (2013.01);
(Continued)

(58) Field of Classification Search
CPC ...................................................... F17C 13/025
(Continued)

(56) References Cited

U.S. PATENT DOCUMENTS 3,549,994 A * 12/1970 Rothermel .......... B01F 13/0233
324/140 R
6,012,411 A   1/2000 Hochbrueckner
(Continued)

FOREIGN PATENT DOCUMENTS

EP    2 110 949    10/2009
EP    2 339 222    6/2011
(Continued)

OTHER PUBLICATIONS

French Search Report and Written Opinion for corresponding FR 1450525, dated Oct. 24, 2013.
(Continued)

*Primary Examiner* — Satish Rampuria
(74) *Attorney, Agent, or Firm* — Elwood L. Haynes

(57) ABSTRACT

The invention concerns a pressurized fluid cylinder equipped with a valve accommodating a first draw-off circuit, the valve comprising a member for regulating the flow and/or the pressure of the fluid drawn off via a member for manually controlling the regulating member, the valve comprising an electronic device for displaying data concerning the amount of fluid contained in a cylinder which is connected to the valve, the electronic display device comprising a member for acquiring, storing, and processing data, and at least one data display connected to the data acquisition, storage and processing member.

10 Claims, 2 Drawing Sheets

(52) U.S. Cl.
CPC ........... *F17C 2201/0109* (2013.01); *F17C 2201/032* (2013.01); *F17C 2201/058* (2013.01); *F17C 2205/0326* (2013.01); *F17C 2221/011* (2013.01); *F17C 2223/0123* (2013.01); *F17C 2250/032* (2013.01); *F17C 2250/034* (2013.01); *F17C 2250/036* (2013.01); *F17C 2250/043* (2013.01); *F17C 2250/0408* (2013.01); *F17C 2250/0439* (2013.01); *F17C 2250/0491* (2013.01); *F17C 2250/0495* (2013.01); *F17C 2250/0694* (2013.01); *F17C 2250/075* (2013.01); *F17C 2250/077* (2013.01); *F17C 2260/028* (2013.01); *F17C 2260/038* (2013.01); *F17C 2270/02* (2013.01); *F17C 2270/025* (2013.01)

(58) Field of Classification Search
USPC .................................. 700/275–306
See application file for complete search history.

(56) References Cited

U.S. PATENT DOCUMENTS

| | | | |
|---|---|---|---|
| 6,098,646 | A | 8/2000 | Hennemann et al. |
| 6,518,749 | B1 | 2/2003 | Oudet et al. |
| 6,795,780 | B1* | 9/2004 | Hyde ............... F15B 19/00 700/281 |
| 7,806,137 | B2* | 10/2010 | Larson ............ F16K 99/0015 137/597 |
| 2004/0045608 | A1 | 3/2004 | Peters et al. |
| 2005/0103342 | A1 | 5/2005 | Jorczak et al. |
| 2008/0150739 | A1 | 6/2008 | Gamard |
| 2009/0050218 | A1 | 2/2009 | Burgess et al. |
| 2010/0071394 | A1* | 3/2010 | Alden ............... F24F 5/0021 62/235.1 |
| 2010/0132474 | A1 | 6/2010 | Bleys et al. |
| 2010/0245098 | A1 | 9/2010 | Kanie |
| 2014/0046465 | A1* | 2/2014 | de Oliveira Antunes .......... B29C 45/76 700/97 |

FOREIGN PATENT DOCUMENTS

| | | |
|---|---|---|
| FR | 2 868 160 | 9/2005 |
| FR | 2 915 798 | 11/2008 |
| GB | 2 486 018 | 6/2012 |
| WO | WO 2005 093377 | 10/2005 |
| WO | WO 2012 164240 | 12/2012 |

OTHER PUBLICATIONS

French Search Report and Written Opinion for related FR 1450524, dated Oct. 24, 2013.
French Search Report and Written Opinion for related FR 1450526, dated Oct. 24, 2013.
French Search Report and Written Opinion for related FR 1450527, dated Oct. 23, 2013.
French Search Report and Written Opinion for related FR 1450528, dated Oct. 24, 2013.
International Search Report and Written Opinion for corresponding PCT/FR2014/053460, dated Mar. 18, 2015.
International Search Report and Written Opinion for related PCT/FR2014/053044, dated Mar. 18, 2015.
International Search Report and Written Opinion for related PCT/FR2014/053045, dated Mar. 18, 2015.
International Search Report and Written Opinion for related PCT/FR2014/053124, dated Mar. 5, 2015.
International Search Report and Int'l Preliminary Report on Patentability for related PCT/FR2015/050011, dated Mar. 18, 2015.

* cited by examiner

PRESSURIZED FLUID CYLINDER COMPRISING AN ELECTRONIC DATA-DISPLAY DEVICE

CROSS REFERENCE TO RELATED APPLICATIONS

This application is a 371 of International PCT Application PCT/FR2014/053460 filed Dec. 19, 2014, which claims priority to French Patent Application No. 1450525 filed Jan. 22, 2014, the entire contents of which are incorporated herein by reference.

BACKGROUND

The present invention relates to a pressurized fluid cylinder.

SUMMARY

The invention relates more particularly to a pressurized fluid cylinder provided with a valve accommodating a first withdrawing circuit comprising a first, upstream end communicating with the storage volume of a pressurized fluid cylinder and a second, downstream end intended to be connected to a consumer of the withdrawn gas, the first withdrawing circuit comprising a member for regulating the flow rate and/or the pressure of the withdrawn fluid between the upstream end and the downstream end, the valve comprising a member for manually controlling the regulating member, the control member being mounted so as to be able to move relative to the body of the valve and cooperating with the regulating member to control the flow rate and/or pressure of fluid allowed to circulate from the upstream end to the downstream end depending on the position of the control member with respect to the body, the valve comprising an electronic device for indicating data relating to the fluid content in a cylinder connected to the valve, the electronic indicating device comprising a member for acquiring, storing and processing data and at least one data display connected to the member for acquiring, storing and processing data, the valve comprising a sensor for sensing the position of the member for manually controlling the regulating member, the position sensor being connected to the member for acquiring, storing and processing data in order to transmit to the latter a signal indicative of the fluid flow rate and/or pressure set by the regulating member.

The invention relates to a valve provided with an electronic device for indicating physical data relating to the content notably of pressurized gas in a pressurized fluid cylinder. The invention relates notably to a device known as an electronic digital pressure gage device. Reference may be made for example to the document FR2868160A1, which describes an example of such a device.

Such a device comprises a pressure sensor and an electronic logic which calculates and displays the data relating to the quantity of fluid and/or to autonomy.

The document FR2915798A1 describes such a device, which displays an information item relating to the use state of the valve by detecting the mode of use (filling, withdrawal, etc.) via the information relating to the pressure measured.

In the field notably of medical gases, the full nature of a cylinder and the guarantee of its non-use after filling may be data that is important to a user.

This can be realized via a mechanical or digital guarantee seal.

A digital guarantee seal can for example display temporary information indicating the full nature as long as the pressure measured in the bottle does not drop below a given threshold. Such a system has problems notably when the pressure in the bottle varies on account of temperature, even though it has not been used. In order to solve this problem, one solution consists in providing pressure thresholds that are sufficient to avoid this phenomenon. However, this risks reducing the precision of detection of actual withdrawal of a relatively small quantity.

In addition, when a display displays only the information relating to the full nature before the cylinder is used (and no quantity or pressure value), the user cannot know the capacity until the cylinder is emptied and the display is changed.

Another problem associated with actual pressure information displayed before first use can be the variation in pressure displayed on account of the variation in temperature or filling inaccuracies. The user can thus be faced with identical filled cylinders displaying different pressure or quantity levels.

It is an aim of the present invention to remedy all or some of the abovementioned drawbacks of the prior art.

To this end, the cylinder according to the invention, which is otherwise in accordance with the generic definition thereof given in the preamble above, is essentially characterized in that, after the cylinder has been filled and before first withdrawal of fluid, the member for acquiring, storing and processing data is configured to cause a fixed information item relating to a given fixed fluid content in the cylinder to be displayed on the display until the position sensor transmits a signal indicative of a non-zero flow rate and/or pressure of fluid withdrawn for a given time and/or until it transmits a signal indicative of a given quantity of fluid withdrawn.

Moreover, embodiments of the invention can include one or more of the following features:

- the member for acquiring, storing and processing data is configured to detect filling of the cylinder via the reception of an external filling signal and/or via the reception of a signal of an increase in the pressure measured in the cylinder above a given filling threshold,
- the information item relating to a given fixed fluid content in the cylinder comprises at least one of: an alphanumeric symbol, a pictorial symbol, a fixed pressure value, a fixed fluid quantity value, the term "full" or "plein", the symbol "100%",
- the member for acquiring, storing and processing data is configured to cause the removal or modification of the display on the display of the information item relating to a given fixed fluid content in the cylinder in response to the reception of a signal from the sensor for sensing the position of the control member that is indicative of the selection of a non-zero withdrawn fluid flow rate and/or pressure for a time of between 0.1 second and 30 seconds and preferably between 0.5 second and 5 seconds,
- the member for acquiring, storing and processing data is configured to calculate the quantity of fluid withdrawn on receiving a signal from the sensor for sensing the position of the control member that is indicative of the selection of a non-zero withdrawn fluid flow rate and/or pressure and to cause the removal or the modification of the display on the display of the information item relating to a given fixed fluid content in the cylinder when this remaining quantity or remaining pressure calculated is equal to a value of between 75% and 99% and preferably between 98% and 90% of the quantity (or, respectively, of the pressure) of the fluid contained in the cylinder after it has been filled, the member for acquiring, storing and processing data is configured to calculate the quantity of fluid withdrawn on receiving a signal from the sensor for sensing the position of the control member that is indicative of the selection of a non-zero withdrawn fluid flow rate and/or pressure and to cause the removal or the modification of the display on the display of the information item relating to a given fixed fluid content in the cylinder when this withdrawn quantity exceeds a volume of between five and one hundred liters of fluid and preferably between ten and fifty liters of fluid, the cylinder has a pressure sensor for measuring the pressure in the cylinder, the pressure sensor being connected to the member for acquiring, storing and processing data in order to transmit to the latter a signal indicative of the fluid pressure measured, the member for acquiring, storing and processing data being configured to calculate the variation in pressure or quantity of fluid in the cylinder from this measured pressure signal and, in response, to suppress or modify the display on the display of the information item relating to a given fixed fluid content in the cylinder when the calculated quantity of fluid withdrawn exceeds a given initial withdrawing threshold, the initial withdrawing threshold is between 0.5% and 10% of the initial quantity of gas, the member for acquiring, storing and processing data is configured to receive both the signal of pressure measured by the pressure sensor and the flow rate and/or pressure signal supplied by the position sensor and to calculate an information item relating to autonomy, pressure or quantity of remaining fluid from these two signals, the autonomy of remaining fluid is determined by calculating, from the initial pressure measured, the theoretical decrease over time in pressure or the quantity of gas generated by the withdrawing flow rate and/or pressure set by the regulating member and/or measured by the pressure sensor, the theoretical value relating to the autonomy or content of fluid remaining in the cylinder is expressed in time remaining (or, respectively, in quantity remaining) by dividing the initial pressure measured by the pressure sensor (or, respectively, a quantity of gas flowing) by the theoretical variation in pressure set by the regulating member (or, respectively, the variation in quantity set by the regulating member), by a formula of the type: Time remaining=Initial pressure/variation in pressure set (or, respectively: Time remaining=Remaining quantity/variation in quantity set), the quantity being estimated via the perfect gas equation ($PV=nRT$) or real gas equation ($PV=ZnRT$) (S.I. units), where P is the pressure measured, V the known volume of the cylinder, n the quantity, R the perfect gas constant and T the temperature measured or approximated to the ambient temperature measured, Z the compressibility factor known from a table or calculation, the member for manually controlling the regulating member is movable into a position known as the "closed" position corresponding to closure of the first withdrawing circuit, that is to say that the flow rate of fluid allowed to pass from the upstream end to the downstream end is zero, the valve comprises a second withdrawing circuit which bypasses the flow rate and/or pressure regulating member of the first withdrawing circuit (3), when the manual control member is in its closed position and the variation in the signal indicative of the fluid pressure within a cylinder is greater than a given variation threshold, the member for acquiring, storing and processing data is configured to detect withdrawal of fluid via the second withdrawing circuit or a leak of fluid and, if need be, cause an information item relating to withdrawal via the second withdrawing circuit and/or relating to a leak to be displayed on the display, at least one of the components and notably one of the sensors (position sensor, pressure sensor) is of the electrical type and powered by a battery and/or an inductive system, said at least one component being able to be powered non-continuously in order to save energy, it being possible for the member for acquiring, storing and processing data to be configured to ensure this power supply when a measurement is taken, when the pressure within the cylinder that is measured by the pressure sensor is lower than a bottom threshold, the member for acquiring, storing and processing data is configured to cause a fixed information item relating to a given fixed fluid content in the cylinder (2), notably "empty", "0%", "call . . . ", "change/fill cylinder", "maximum service capacity in liters, volume or pressure of the cylinder", "maintenance date", to be displayed on the display.

The invention can also relate to any alternative device or method comprising any combination of the above or following features.

BRIEF DESCRIPTION OF THE DRAWINGS

Further particular features and advantages will become apparent from reading the following description, which is given with reference to the figures, in which.

DESCRIPTION OF PREFERRED EMBODIMENTS

Figures 1, 2, 3, 4, 5:
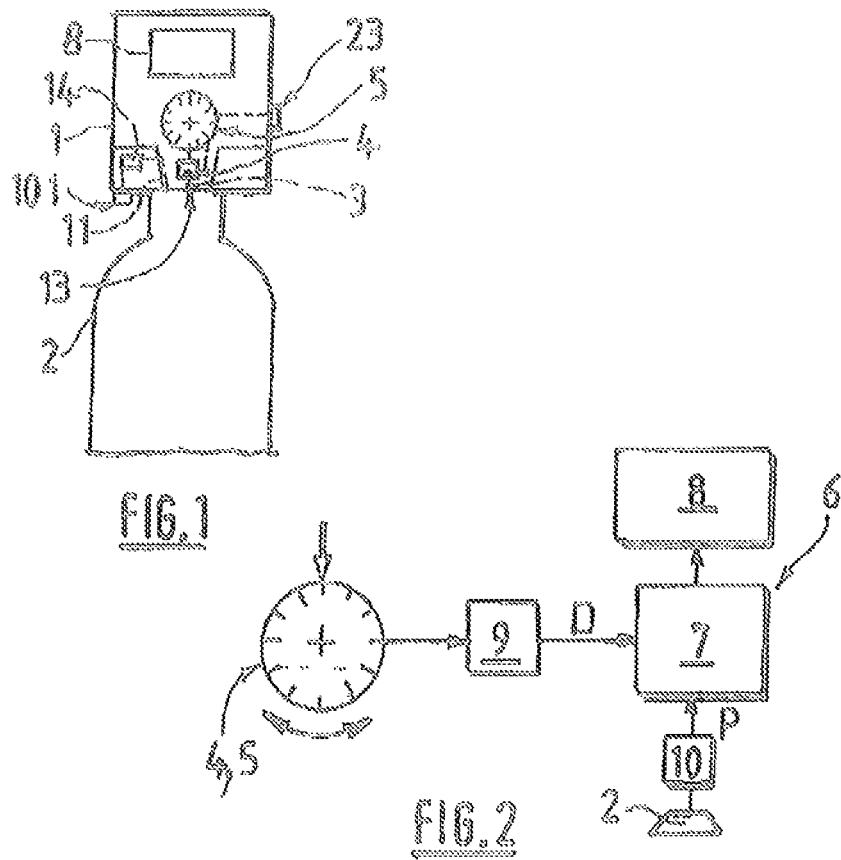
FIG. 1 shows a schematic and partial side view illustrating a valve mounted on a pressurized gas cylinder according to one possible exemplary embodiment of the invention, FIG. 2 schematically and partially illustrates the structure and operation of a part of the valve from FIG. 1, FIGS. 3 to 5 schematically and partially illustrate the structure and operation of three respective examples of position sensors of a valve according to the invention, FIG. 6 schematically shows two curves illustrating examples of signals generated by one or more position sensors from FIG. 5, FIGS. 7 and 8 schematically and partially illustrate the structure and operation of a fourth example and a fifth example, respectively, of a position sensor of the valve according to the invention, FIG. 9 schematically shows an example of a pressure curve measured over time.
Figure 6:
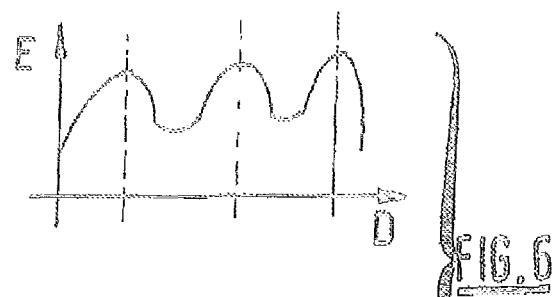
Figure 6:
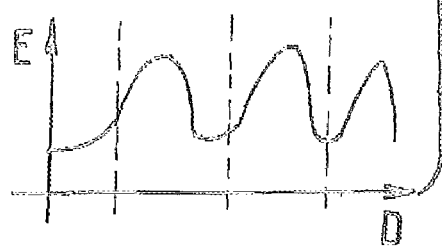
Figure 7:
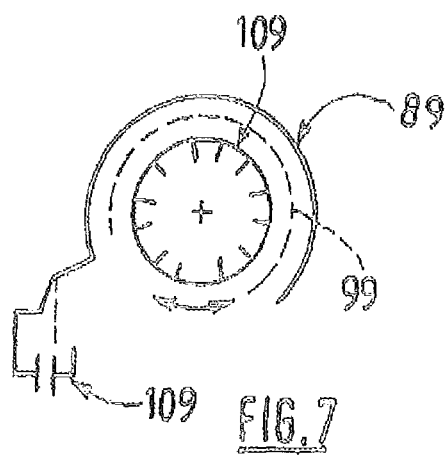

FIG. 1 schematically shows a pressurized gas cylinder 2 provided with a valve 1 that is able to implement the invention.

The pressurized fluid cylinder 2 is provided with a valve 1 comprising a body provided with an end mounted in the orifice of the cylinder 2 (for example by screwing).

In a conventional manner, the body of the valve 1 accommodates a first withdrawing circuit 3 comprising a first, upstream end 13 communicating with the storage volume of the cylinder 2. The withdrawing circuit 3 comprises a second, downstream end 23 intended to be connected to a consumer of the withdrawn gas (for example a patient in the case of oxygen or some other medical gas).

The first withdrawing circuit 3 comprises a member 4 for regulating the flow rate and/or the pressure of the withdrawn fluid between the upstream end 13 and downstream end 23. This regulating member 4 is for example a flow rate regulator having calibrated orifices 16, making it possible to select a withdrawn gas flow rate (cf. the schematic depiction in FIG. 3). Of course, any other regulating member is conceivable, for example a valve with a proportional opening.

The valve 1 comprises a member 5 for manually controlling the member 4. The control member 5 is mounted so as to be able to move relative to the body of the valve 1 and cooperates with the regulating valve 4 to control the flow rate and/or pressure of fluid allowed to circulate depending on the position of the control member 5 with respect to the body of the valve. The control member 5 comprises for example a rotary hand wheel. Of course, any other appropriate system is conceivable (pivoting lever, digital control, wireless control via a remote control, etc.). For example, the control member 5 selects a calibrated orifice and/or controls a flow rate restriction valve depending on its position among a plurality of separate stable positions or a plurality of positions of a continuous movement. In particular the stable positions can be mechanically referenced by a hard point (for example via a detent system).

The valve 1 comprises an electronic device 6 for indicating data relating to the content of fluid in a cylinder 2 connected to the valve 1. The device can be of the type comprising a member 7 for acquiring, storing and processing data and at least one data display 8 connected to the member 7 for acquiring, storing and processing data. The member 7 for acquiring, storing and processing data comprises for example a computer and/or a microprocessor or any other equivalent system.

Of course, this device can have one or more data receiving members (via a wired and/or wireless connection) and also one or more data output members (via a wired and/or wireless connection).

The valve 1 has a sensor 9 for sensing the position of the member 5 for manually controlling the regulating member 4. The position sensor 9 is connected to the member 7 for acquiring, storing and processing data in order to transmit to the latter a signal indicative of the fluid flow rate and/or pressure set by the regulating member 4. For example, the sensor 9 for sensing the position of the control member 5 comprises a converter for converting the mechanical movement of the control member into an electrical signal that is exploitable by the member 7 for acquiring, storing and processing data.

The detector is for example secured to a fixed part of the valve or, respectively, the control member, the detector outputting an electrical or digital signal determined depending on the position of the control member 5. This signal can be output in a wired and/or wireless manner.

The sensor 9 for sensing the position of the control member 5 can comprise for example at least one of: a capacitive sensor, a magnetic sensor, a mechanical sensor, an optical sensor.

The manual control member 5 and/or the regulating member 4 may be able to move into a plurality of separate positions (which are or are not mechanically stable) that correspond to respective flow rate and/or pressure values of fluid allowed to pass from the upstream end 13 to the downstream end (with a scale for example).

As illustrated in FIG. 2, the valve can optionally also have a pressure sensor 10 intended to measure the pressure within the storage volume of the cylinder 2. The pressure sensor 10 is then connected to the member 7 for acquiring, storing and processing data in order to transmit to the latter (in a wired and/or wireless manner) a signal indicative of the fluid pressure measured, notably in real time or periodically. The pressure sensor 10 can be situated for example at the upstream end of the first withdrawing circuit 3 and/or at a second withdrawing circuit 11.

The member 7 for acquiring, storing and processing data is configured to calculate and display on the display 8 an information item relating to autonomy and/or remaining content and/or flow rate withdrawn.

According to one advantageous particular feature, after the cylinder 2 has been filled and before first withdrawal of fluid of an information item, the member 7 for acquiring, storing and processing data is configured to cause an information item relating to a given fixed fluid content in the cylinder 2 to be displayed on the display 8. This fixed information item relates to the full and non-used nature of the cylinder after filling (digital guarantee seal). This information relating to the full nature is maintained until the position sensor 9 transmits a signal indicative of a non-zero flow rate and/or pressure of fluid withdrawn for a given time and/or until it transmits a signal indicative of a given quantity of fluid withdrawn to the member 7 for acquiring, storing and processing data.

For example, the member 7 for acquiring, storing and processing data can be configured to cause the removal or modification of the display on the display 8 of the information item relating to a given fixed fluid content in the cylinder 2 in response to the reception of a signal from the sensor 9 for sensing the position of the control member 5 that is indicative of the selection of a non-zero withdrawn fluid flow rate and/or pressure for a given time. This given time is for example between 0.1 and 30 seconds and preferably between 0.5 second and 5 seconds.

As illustrated in FIG. 2, the valve (or the cylinder itself) can have a pressure sensor 10 that measures the pressure in the cylinder 2.

Thus, in the same way, when the valve 1 or the cylinder 2 has a pressure sensor 10 for measuring the pressure in the cylinder 2, said pressure sensor 10 being connected to the member 7 for acquiring, storing and processing data, the latter can also be configured to calculate the variation in pressure or in quantity of fluid in the cylinder 2 from this measured pressure P signal and, in response, can be configured to initiate the suppression or modification of the display on the display 8 of the fixed information item relating to the full nature when the calculated quantity of fluid withdrawn exceeds a given initial withdrawing threshold.

The initial withdrawing threshold is for example between 0.5% and 10% of the initial quantity of gas, for example 1 to 5% of the initial quantity. This makes it possible to ignore fluctuations that are due to the variation in temperature.

The information item relating to the full nature (given fixed fluid content in the cylinder) can comprise for example at least one of: an alphanumeric symbol, a pictorial symbol, a fixed pressure value, a fixed fluid quantity value (in volume or in mass), the term "full" or "plein", the symbol "100%", or any other equivalent symbol.

After filling, the member 7 for acquiring, storing and processing data can be configured to display a pressure, quantity or autonomy value. After filling, the member 7 for acquiring, storing and processing data is thus aware of the full nature of the cylinder and also the quantity of fluid stored. Preferably, this value is fixed and for example rounded by a few percent to a reference value (for example 500 liters instead of 489 or 503 actual liters), regardless of the actual level after filling. This makes it possible to display clear and uniform information notably when several identical cylinders are used. This displayed value is preferably fixed, even in the event of fluctuation due to the variation in temperature.

Preferably, the member 7 for acquiring, storing and processing data is configured to detect filling of the cylinder 2 via the reception of an external filling signal and/or via the reception of a signal of an increase in the pressure P measured in the cylinder above a given filling threshold. The information relating to new filling automatically initiates the display of the information relating to the full nature of the cylinder 2. For example, the filling information is sent to an information receiving port of the member 7 for acquiring, storing and processing data by a filling station, an operator. This filling can also be detected automatically by the member 7 for acquiring, storing and processing data by measuring the pressure P curve via the sensor 10 (pressure value and shape of the curve).

In order to detect first withdrawal, for example, the member 7 for acquiring, storing and processing data is configured to calculate the quantity of fluid withdrawn on receiving a signal from the sensor 9 for sensing the position of the control member 5 that is indicative of the selection of a non-zero withdrawn fluid flow rate and/or pressure and to cause the removal or the modification of the display on the display 8 of the information item relating to a given fixed fluid content in the cylinder 2 when this remaining quantity or remaining pressure calculated is between 75% and 99% and preferably between 98% and 90% of the quantity (or, respectively, of the pressure) of the fluid contained in the cylinder 2 after it has been filled. This pressure level can, if need be, be corrected in terms of temperature, that is to say calculated at a reference temperature, for example 23° C. or 15° C. To this end, the device can have a temperature sensor inside and/or outside the cylinder.

In other words, when, after filling, the position sensor 9 indicates that a sufficient quantity has been withdrawn, the member 7 for acquiring, storing and processing data can suppress or modify this guarantee seal.

For example, the member 7 for acquiring, storing and processing data can be configured to cause the removal or modification of the display on the display 8 of the information item relating to a given fixed fluid content in the cylinder 2 when this withdrawn quantity exceeds a volume of between five and thirty liters of fluid and preferably between fifteen and twenty-five liters of fluid.

The member 7 for acquiring, storing and processing data can be configured to receive both the signal of pressure P measured by a pressure sensor 10 and the flow rate and/or pressure D signal supplied by the position sensor 9 and to calculate an information item relating to autonomy, pressure or quantity of remaining fluid from these two signals.

In addition, the autonomy of remaining fluid can also be determined by calculating, from the initial pressure measured, the theoretical decrease over time in pressure or the quantity of gas generated by the withdrawing flow rate and/or pressure D set by the regulating member 4 and/or measured by the pressure sensor 10.

In addition, after or at the time of the first withdrawal, the member 7 for acquiring, storing and processing data can be configured to cause an information item relating to the fluid flow rate and/or pressure set by the regulating member 4 to be displayed on the display 8 in response to the reception of this set flow rate and/or pressure signal.

The member 7 for acquiring, storing and processing data can thus be programmed to calculate from these two information items an information item relating to autonomy of remaining fluid of flow rate withdrawn.

The theoretical autonomy of remaining fluid is determined for example by calculating, from the initial pressure measured, the theoretical decrease over time in pressure or the quantity of gas generated by the withdrawing flow rate and/or pressure D set by the regulating member 4 or measured by the pressure sensor 10.

The theoretical information relating to the autonomy or content of fluid remaining in the cylinder 2 can be expressed in time remaining (or, respectively, in quantity remaining) by dividing the initial pressure measured by the pressure sensor 10 (or, respectively, a quantity of gas flowing) by the theoretical variation in pressure set by the regulating member 4 (or, respectively, the variation in quantity set by the regulating member (4)), by a formula for example of the type: Time remaining=Initial pressure/variation in pressure set (or, respectively: Time remaining=Remaining fluid content/variation in quantity set).

In the same way, the actual information relating to autonomy can be expressed in time remaining (or, respectively, in quantity remaining) by dividing the initial pressure measured by the pressure sensor 10 (or, respectively, a quantity of gas flowing) by the actual variation in pressure measured by the pressure sensor 10 (or, respectively, the variation in quantity calculated from the pressure P measured), by a formula for example of the type: Time remaining=Initial pressure/variation in actual pressure (or, respectively: Time remaining=Remaining fluid content/variation in quantity measured).

The theoretical variations in quantity or pressure can be calculated for example via the perfect gas equation $PV=nRT$ or real gas equation $PV=ZnRT$ (S.I. units), where P is the pressure measured, V the known volume of the cylinder, n the quantity, R the perfect gas constant and T the temperature measured or approximated to the ambient temperature measured, Z the compressibility factor presumed to be known (table or calculation). Similarly, the conversions between pressure and quantity can be calculated via the perfect gas equation or any other equivalent formula, the volume of the cylinder 2 being known and entered in the member 7 for acquiring, storing and processing data and the temperature can be measured by an ambient external sensor or calculated or entered or approximated.

The member 7 for acquiring, storing and processing data can be configured to calculate an information item relating to the autonomy or content of fluid over a given period of time of between fifteen seconds and ten minutes, and preferably between thirty seconds and five minutes, from the pressure signal measured by the pressure sensor 10. The member 7 for acquiring, storing and processing data is preferably configured to periodically compare this autonomy information calculated on the basis of the measured pressure P signal with the theoretical autonomy information calculated from the variation in quantity or pressure set by the regulating member 4.

The dynamic pressure measurement can make it possible to adjust the display of the effective flow rate withdrawn and/or the autonomy displayed more precisely, if necessary.

If need be, a (visible and/or audible and/or wireless) warning signal can be output in the event of a divergence or an anomaly.

Similarly, the member 7 for acquiring, storing and processing data can be configured to recalculate and display automatically an update of the information relating to the autonomy, content or flow rate of fluid on receiving a signal from the position sensor 9 indicating a change in fluid flow rate and/or pressure set by the regulating member 4 via the control member 5.

Preferably, the member 5 for manually controlling the regulating member 4 is movable into a position known as the "closed" position corresponding to closure of the first withdrawing circuit 3. In other words, the flow rate of fluid allowed to pass from the upstream end 13 to the downstream end 23 is zero.

As illustrated in FIG. 1, the valve 1 can comprise a second withdrawing circuit 11, for example separate from the first withdrawing circuit 3, which bypasses the flow rate and/or pressure regulating member 4 of the first withdrawing circuit 3.

If need be, this second withdrawing circuit 11 can have a portion in common with the first withdrawing circuit 3.

This second withdrawing circuit 11 is provided for example to supply a gas at a regulated pressure (via a pressure relief valve 14). For example, the second withdrawing circuit 11 supplies a variable or fixed pressure f of around three to ten bar to a user appliance. For example, the second withdrawing circuit 11 has an outlet connection 101 (for example via a toothed connector) that can be connected to a medical ventilator in order to supply oxygen thereto.

This second withdrawing circuit 11 can supply gas from the cylinder 2 independently of the first withdrawing circuit 3. Thus, when the manual control member 5 is in its closed position and the variation in the signal indicative of the fluid pressure within a cylinder 2 (measured by the pressure sensor 10) is greater than a given variation threshold (for example 25 mbar per minute), the member 7 for acquiring, storing and processing data can detect withdrawal of fluid via the second withdrawing circuit 11 or, if this second withdrawing circuit 11 is not being used, a possible leak of fluid.

Similarly, the withdrawal of fluid via the second circuit can be detected and can suppress or modify the display of the guarantee seal even if the control member 5 has not been manipulated.

The member 7 for acquiring, storing and processing data can, if need be, cause an information item relating to withdrawal via the second withdrawing circuit 11 and or relating to a leak (warning signal) to be displayed on the display 8 or to be output (wirelessly, in a wired manner or audibly).

In particular, when the manual control member 5 is in its position known as the closed position and the variation in the signal indicative of the fluid pressure within a cylinder is greater than a given variation threshold (for example 25 mbar per minute), the member 7 for acquiring, storing and processing data can be configured to detect at least one characteristic of the form of the variation in fluid pressure in the cylinder on account of the withdrawal via the second withdrawing circuit 11.

The at least one characteristic comprises for example: a periodic character of the variation in pressure or quantity, the frequency of the variation in pressure or quantity, the level of variation in pressure or quantity, etc.

As illustrated schematically in FIG. 10, this makes it possible to instantaneously detect, at the end of two to three pressure oscillations, for example periodic withdrawal corresponding to a gas supply to a respiratory ventilator. Specifically, even if the gas withdrawn does not pass through the flow rate regulator 4, the flow rate is regulated directly by a ventilator and depends on the patient's breathing. This flow rate thus delivered is not constant but oscillates over time (depending on the patient's breathing).

In the event that this pressure signal does not correspond to a ventilation signal (for example a continuous decreasing variation), the member 7 for acquiring, storing and processing data can determine that it is a leak or incorrect use of the gas, and can signal this in the same way.

According to one advantageous particular feature, when the manual control member 5 is disposed in an intermediate position between two respective adjacent flow rate and/or pressure values of fluid allowed to pass from the upstream end 13 to the downstream end 23, the member 7 for acquiring, storing and processing data is configured to select and display on the display 8 one or both of these adjacent values, a range defined by these values or an intermediate value between these two adjacent values. Alternatively, in this scenario, the member 7 for acquiring, storing and processing data can be configured to suppress all or some of the display of the variables usually displayed (flow rate, pressure, quantity, autonomy, etc.).

If need be, this information can be used to detect first withdrawal.

Similarly, one of these two adjacent values or an intermediate value between these two adjacent values can be used for the theoretical calculation of a withdrawn flow rate or remaining quantity value as described above.

Preferably, the member 7 for acquiring, storing and processing data displays and/or signals the most critical or most unfavorable value for the user (wireless remote transmission or wired or audible transmission).

This makes it possible to ergonomically warn the user of incorrect manipulation by displaying relevant but disadvantageous information, obliging him to correct his selection.

The device can be configured to deliver in this case a fluid flow rate corresponding to one of the two adjacent values, notably the displayed value.

Preferably, when the manual control member 5 is disposed in an intermediate position between two respective adjacent flow rate and/or pressure values of fluid allowed to pass from the upstream end 13 to the downstream end 23, the regulating member 4 is designed to allow the withdrawal of fluid at a non-zero flow rate between said two respective adjacent flow rate and/or pressure values, notably the value displayed.

As illustrated in FIG. 3, the sensor 9 for sensing the position of the control member 5 can comprise for example a mechanism 19 that meshes with the control member 5 (a meshing and/or notching system) and a potentiometer 39. The mechanism has a moving part 29 (for example a wheel or a rod or a rack) that forms a wiper of the potentiometer 39. In this way, the position sensor 9 supplies a voltage and/or resistance value determined depending on the position of the control member 5.

In the example in FIG. 4, the sensor 9 for sensing the position of the control member 5 comprises a mechanism that meshes with the control member 5 comprising an optical and/or digital encoder 49, for example a wired encoder (live wire and ground wire). The encoder 49 supplies a digital signal determined depending on the position of the control member 5. Depending on the position of the mechanism, one or more wires are live or short-circuited, forming a plurality of separate signals for characterizing different positions (for example $2^{n-1}$ for a system having n wires).

As illustrated in FIG. 5, the sensor 9 for sensing the position of the control member 5 can comprise a magnetic system having at least one magnet 59 secured to the control member 5 and at least one detector 69, 79 for detecting the magnetic field of the at least one magnet 59. If the control member 5 moves (such as by rotation), one detector 69 detects for example a magnetic field E depending on the movement D which oscillates and makes it possible to characterize a plurality of positions. When the device comprises a second detector 79 (or more), several separate signals can be exploited simultaneously in order to improve the detection of the separate positions.

Figure 8:
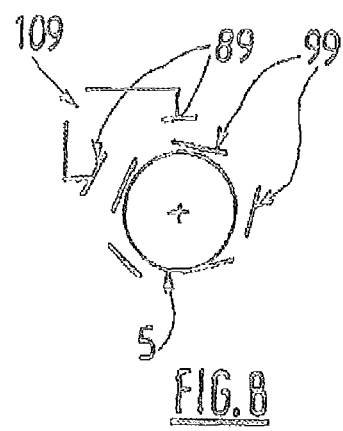
Figure 9:
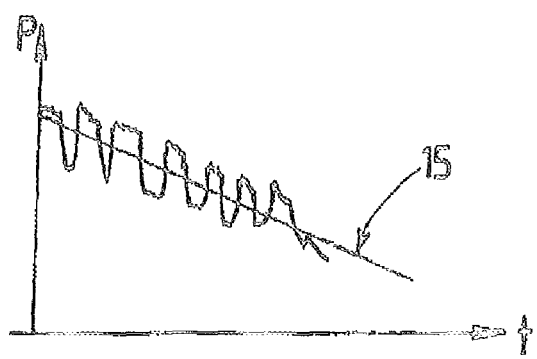

As illustrated in FIGS. 8 and 9, the sensor 9 for sensing the position of the control member 5 can comprise a capacitive system 109 that measures an electrical capacitance between a fixed magnetic reference 89 and a moving part 99 connected to the control member 5.

All of these systems have the advantage of reliable detection without the need to provide electric wires linked to a moving part of the mechanism.

The potentiometer system and more generally each detection system can be calibrated easily during production.

Thus, when the manual control member 5 is in its closed position and the variation in the signal indicative of the fluid pressure within a cylinder 2 is greater than a given variation threshold, the member 7 for acquiring, storing and processing data can be configured to calculate an information item relating to the autonomy of remaining fluid from the single measurement of the initial-pressure signal and the variation in this pressure signal provided by the pressure sensor 10. The member 7 for acquiring, storing and processing data can notably be configured to cause this calculated autonomy information item and/or an information item relating to the initial quantity or pressure of fluid in the cylinder 2 to be displayed on the display 8.

Although the invention is relatively simple and inexpensive, it is easy to see that it makes it possible to display reliable information relating to the state and the mode of use of the cylinder more quickly.

The invention applies advantageously to pressurized gas cylinders, notably cylinders containing pressurized oxygen.

The invention claimed is:

1. A pressurized fluid cylinder provided with a valve accommodating a first withdrawing circuit comprising a first, upstream end communicating with a storage volume of a pressurized fluid cylinder and a second, downstream end configured to connect a consumer of the withdrawn gas, the first withdrawing circuit comprising:

a member for regulating the flow rate and/or the pressure of the withdrawn fluid between the upstream end and the downstream end, the valve comprising a member for manually controlling the regulating member, a control member being mounted so as to move relative to the body of the valve and cooperating with the regulating member to control the flow rate and/or pressure of fluid allowed to circulate from the upstream end to the downstream end depending on the position of the control member with respect to the body, the valve comprising an electronic device configured to indicate data relating to the fluid content in a cylinder connected to the valve, the electronic device acquiring, storing and processing data and at least one data display connected to the member for acquiring, storing and processing data, the valve comprising a sensor for sensing the position of the member for manually controlling the regulating member, the position sensor acquiring, storing and processing data in order to transmit to a latter a signal indicative of the fluid flow rate and/or pressure set by the regulating member, wherein after the cylinder has been filled and before first withdrawal of fluid, the electronic device acquiring, storing and processing data is configured to cause a fixed information item relating to a given fixed fluid content in the cylinder to be displayed on the display until the position sensor transmits a signal indicative of a non-zero flow rate and/or pressure of fluid withdrawn for a given time and/or until the position sensor transmits a signal indicative of a given quantity of fluid withdrawn, said information item relating to a given fixed fluid content in the cylinder comprising one of the elements selected from the group consisting of: an alphanumeric symbol, a pictorial symbol, a fixed pressure value, a fixed fluid quantity value, the term "full" or "plein", and the symbol "100%", and wherein the electronic device acquiring, storing and processing data is configured to determine the quantity of fluid withdrawn on receiving a signal from the sensor for sensing the position of the control member that is indicative of the selection of a non-zero withdrawn fluid flow rate and/or pressure and to cause the removal or modification of the display on the display of the information item relating to a given fixed fluid content in the cylinder when this remaining quantity or remaining pressure determined is equal to a value of between 75% and 99% of the quantity of the fluid contained in the cylinder after it has been filled and/or to cause the removal or modification of the display on the display of the information item relating to a given fixed fluid content in the cylinder in response to the reception of said signal from the sensor for sensing the position of the control member that is indicative of the selection of a non-zero withdrawn fluid flow rate and/or pressure for a time of between 0.1 second and 30 seconds.

2. The cylinder of claim 1, wherein the electronic device acquiring, storing and processing data is configured to detect filling of the cylinder via the reception of an external filling signal and/or via the reception of a signal of an increase in the pressure measured in the cylinder above a given filling threshold.

3. The cylinder of claim 1, wherein the electronic device acquiring, storing and processing data is configured to determine the quantity of fluid withdrawn on receiving a signal from the sensor for sensing the position of the control member that is indicative of the selection of a non-zero withdrawn fluid flow rate and/or pressure and to cause the removal or the modification of the display on the display of the information item relating to a given fixed fluid content in the cylinder when this withdrawn quantity exceeds a volume of between five and one hundred liters of fluid.

4. The cylinder of claim 1, further comprising a pressure sensor for measuring the pressure in the cylinder, the pressure sensor being connected to the electronic device acquiring, storing and processing data in order to transmit to the latter a signal indicative of the fluid pressure measured, the member for acquiring, storing and processing data being configured to determine the variation in pressure or quantity of fluid in the cylinder from this signal of pressure P measured and, in response, to suppress or modify the display on the display of the information item relating to a given fixed fluid content in the cylinder when the determined quantity of fluid withdrawn exceeds a given initial withdrawing threshold.

5. The cylinder of claim 4, wherein the initial withdrawing threshold is between 0.5% and 10% of the initial quantity of gas.

6. The cylinder of claim 1, wherein the electronic device acquiring, storing and processing data is configured to receive both the signal of pressure measured by the pressure sensor and the flow rate and/or pressure signal supplied by the position sensor and to determine an information item relating to autonomy, pressure or quantity of remaining fluid from these two signals.

7. The cylinder of claim 6, wherein the autonomy of remaining fluid is determined by determining, from the initial pressure measured, the theoretical decrease over time in pressure or the quantity of gas generated by the withdrawing flow rate and/or pressure set by the regulating member and/or measured by the pressure sensor.

8. The cylinder of claim 1, wherein the theoretical value relating to the autonomy or content of fluid remaining in the cylinder is expressed in time remaining by dividing the initial pressure measured by the pressure sensor by the theoretical variation in pressure set by the regulating member, by a formula of the type: Time remaining=Initial pressure/variation in pressure set the quantity being estimated via the perfect gas equation (PV=nRT) or real gas equation (PV=ZnRT), where P is the pressure measured, V the known volume of the cylinder, n the quantity, R the perfect gas constant and T the temperature measured or approximated to the ambient temperature measured, Z the compressibility factor known from a table or calculation.

9. The cylinder of claim 1, wherein the member for manually controlling the regulating member is movable into a position known as the "closed" position corresponding to closure of the first withdrawing circuit.

10. The cylinder as of claim 9, wherein the valve further comprises a second withdrawing circuit which bypasses the flow rate and/or pressure regulating member of the first withdrawing circuit, and in that, when the manual control member is in its closed position and the variation in the signal indicative of the fluid pressure within a cylinder is greater than a given variation threshold, the electronic device acquiring, storing and processing data is configured to detect withdrawal of fluid via the second withdrawing circuit or a leak of fluid and cause an information item relating to withdrawal via the second withdrawing circuit and/or relating to a leak to be displayed on the display.

* * * * *